Patented July 31, 1945

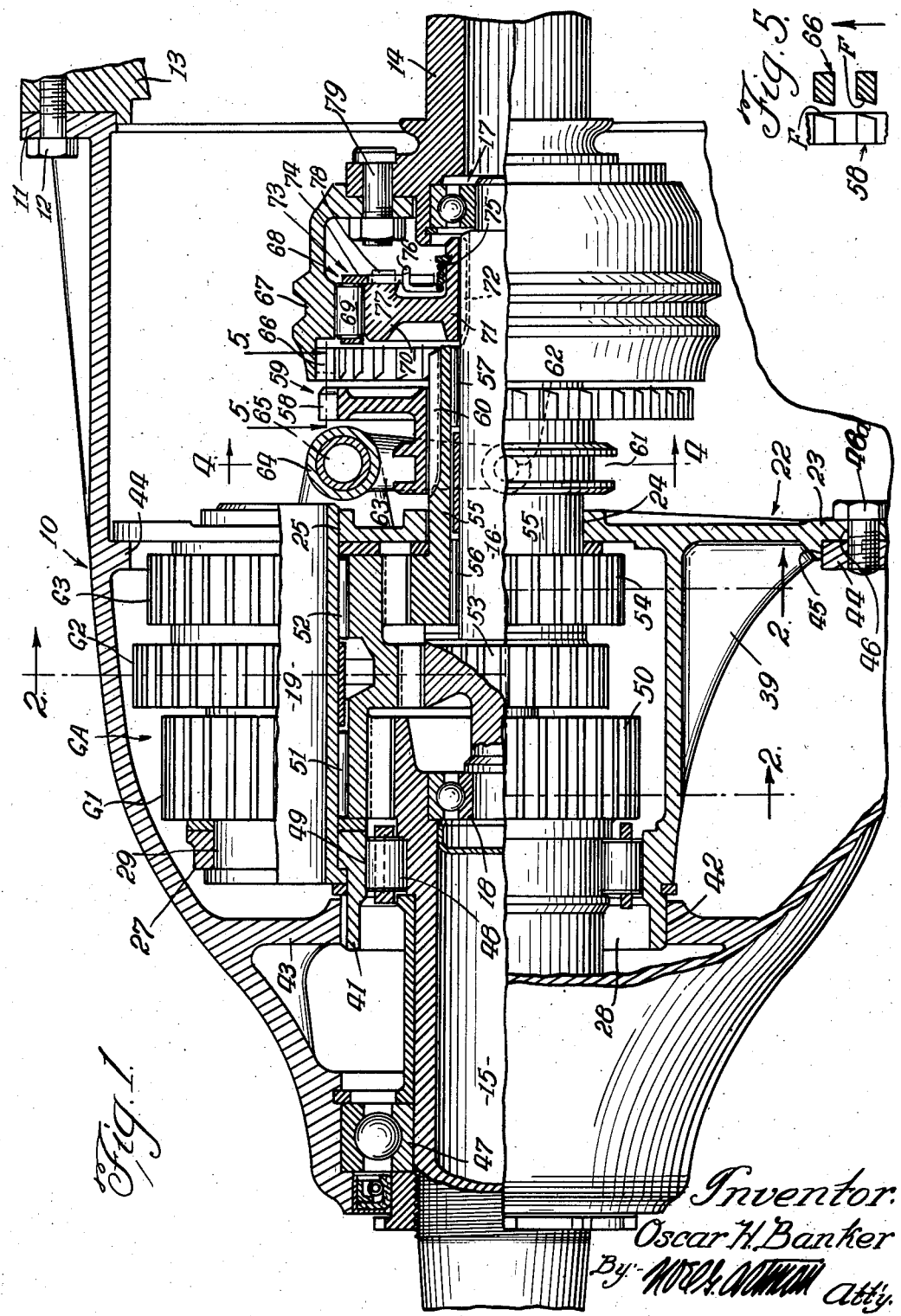

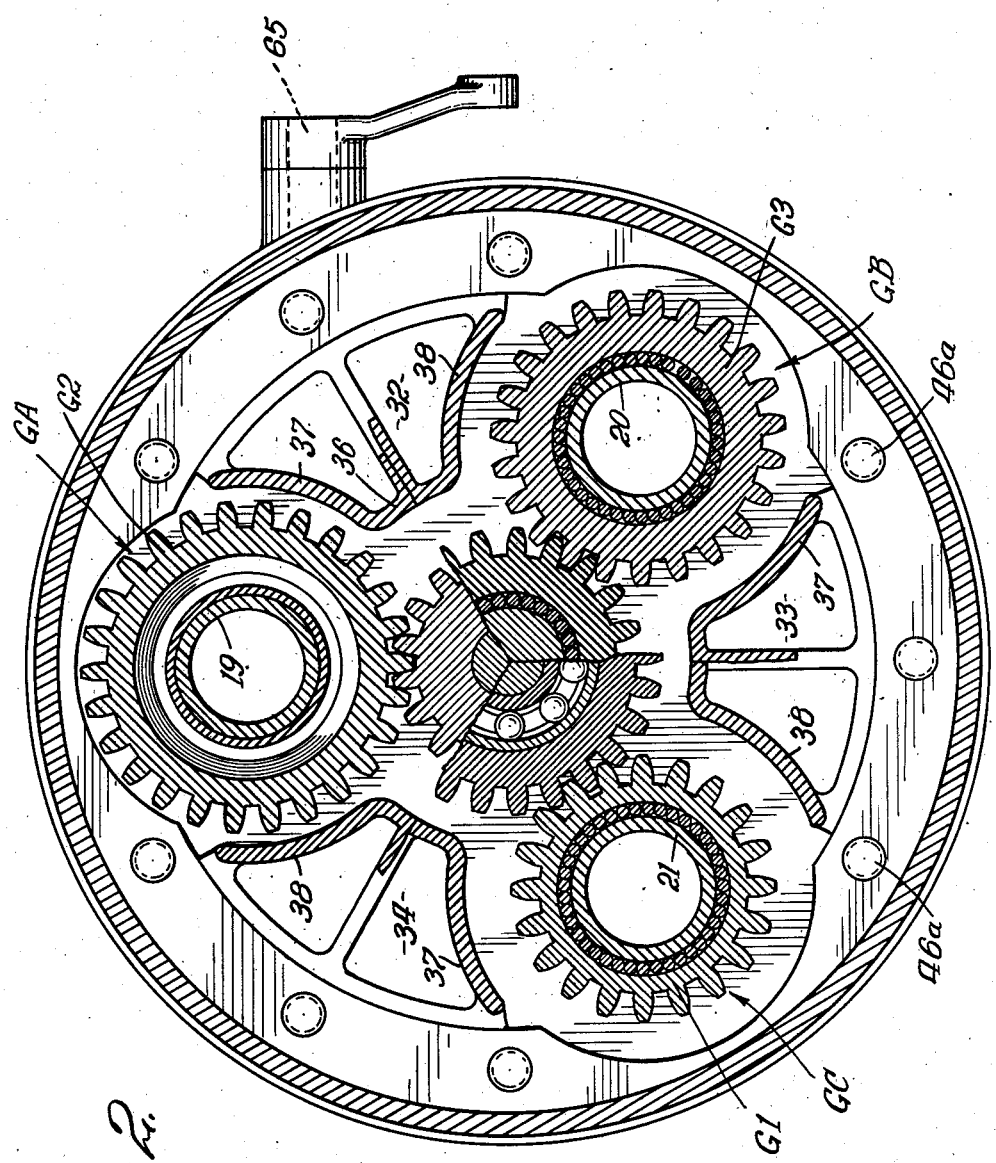

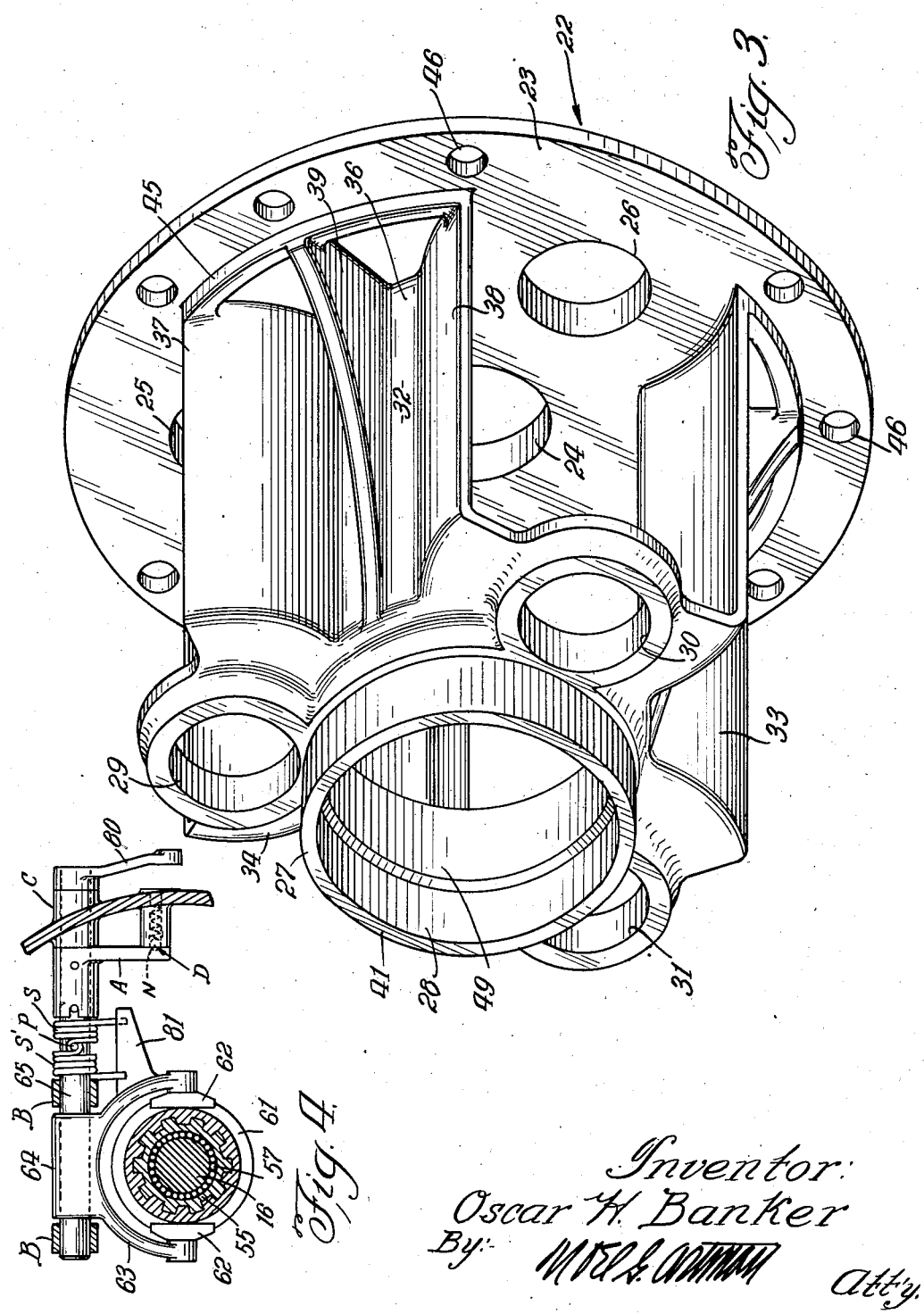

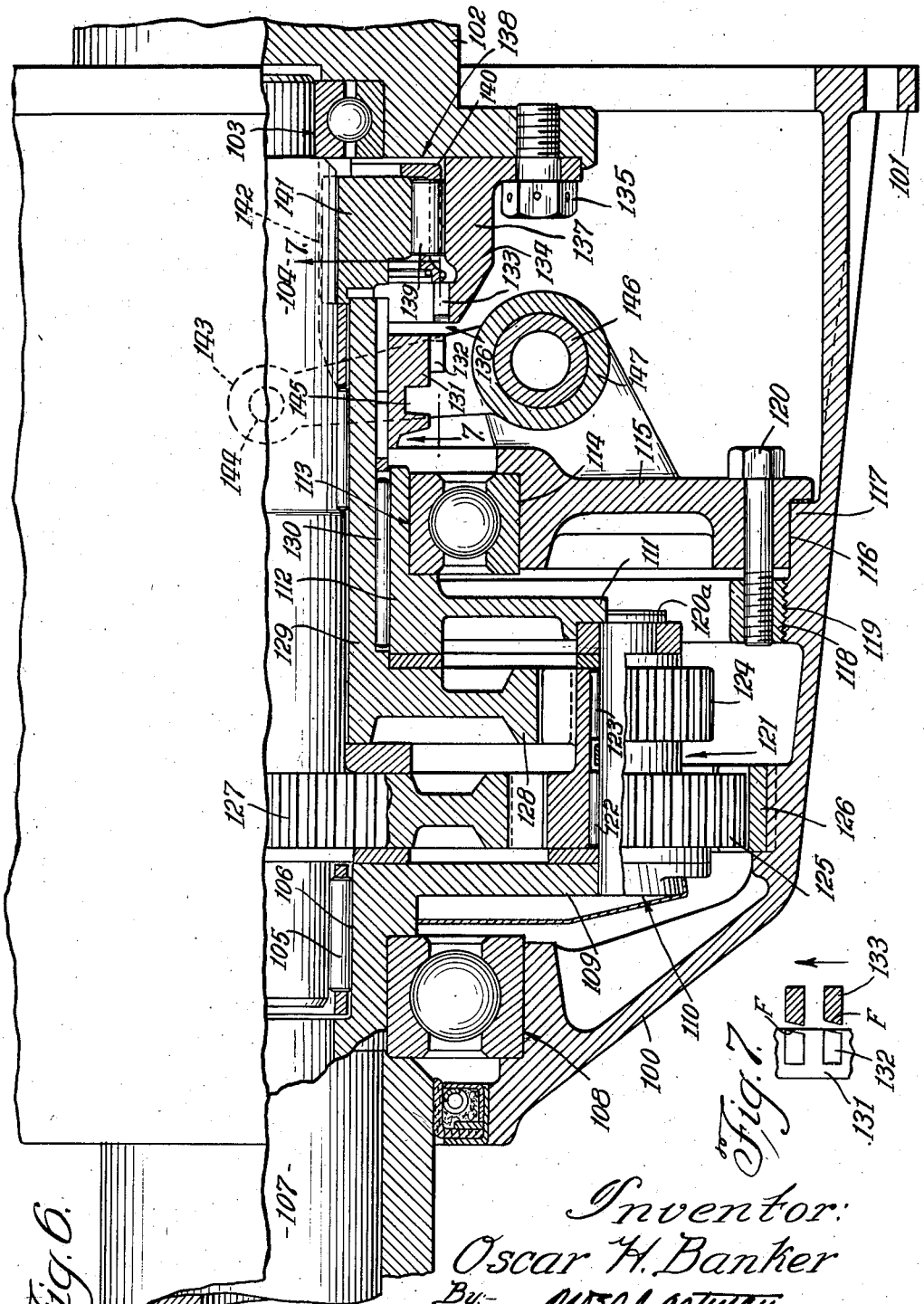

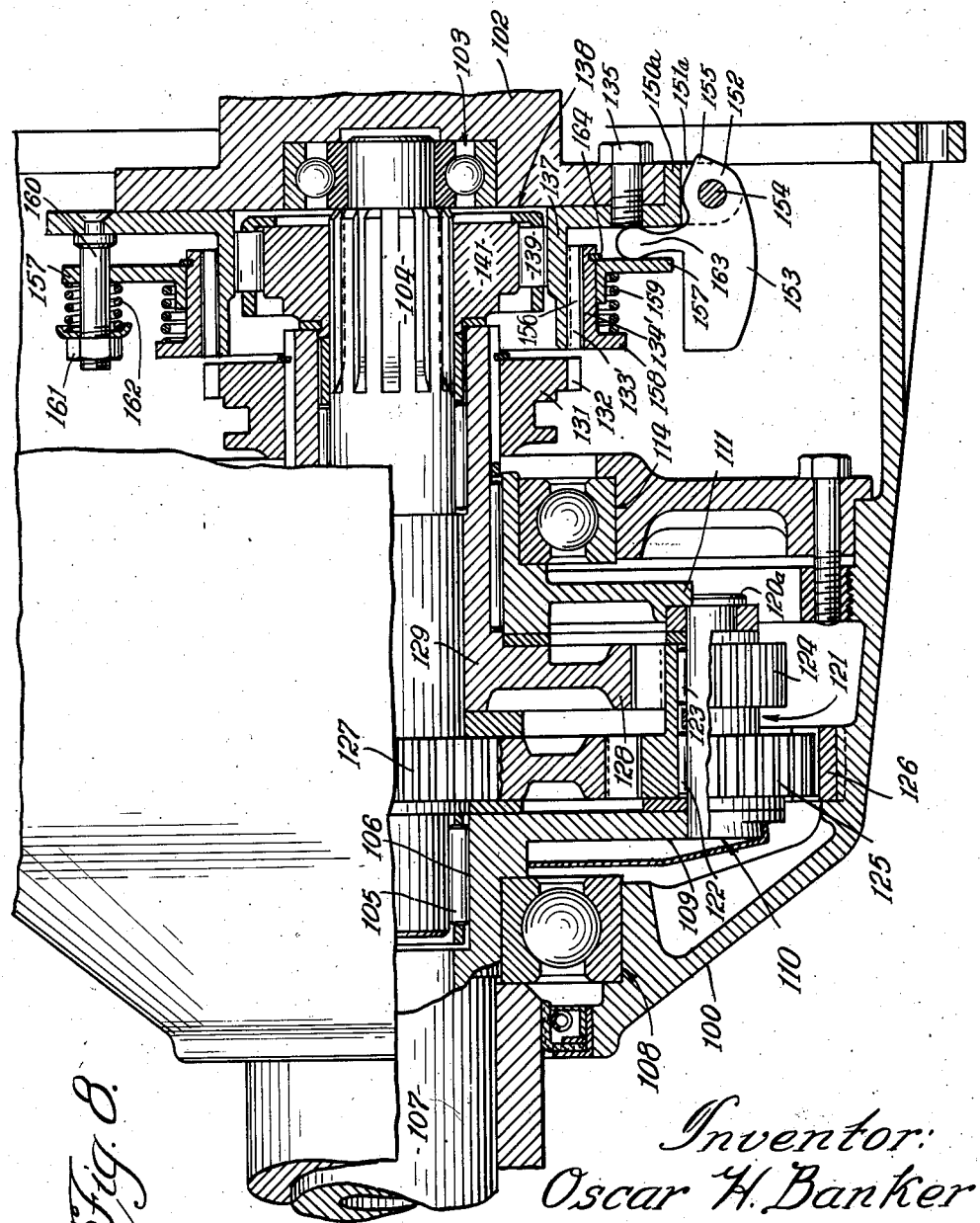

2,380,390

UNITED STATES PATENT OFFICE 2,380,390

CHANGE-SPEED GEARING FOR AIRCRAFT PROPELLERS

Oscar H. Banker, Evanston, Ill., assignor to New Products Corporation, Chicago, Ill., a corporation of Delaware Application June 14, 1941, Serial No. 398,135

1 Claim. (Cl. 74—368)

The general object of this invention is the provision of a change-speed transmission operable through either of two speed reduction gear trains of which the train of higher ratio possesses sufficient speed reduction and torque multiplying power to enable a comparatively small engine to operate at an efficient speed while driving a fixed and comparatively large pitch propeller at the proper speed, under cruising conditions, for efficiently absorbing the developed engine power, and of which power trains the one of lower ratio enables the engine to drive such propeller fast enough for rapid take-off, climb and acceleration.

A further object of the present invention is the provision of a transmission as the above that is sufficiently light in weight and inexpensive to warrant its use upon light aircraft whereby such craft can be practically equipped to obtain good performance under both starting and cruising conditions, approaching that heretofore attainable only with the variable pitch propeller installations which are practical only on the heavier craft because of their weight and cost.

Another object of this invention is the provision of an improved gearing arrangement wherein there are central gears in meshed driving relation with respective pluralities of other gears disposed about their toothed peripheries, to decrease the tooth load and thus result in a unit which may be made small in comparison to its load capacity.

The invention further contemplates an improved inner skeleton frame possessing sufficient strength and rigidity for retaining the shafting and gearing in the proper operating relation, and a lightweight casing for such frame.

A further object is the provision of a change-speed transmission particularly adapted for aircraft use in that it is always conditioned for operation in one of its power trains to avoid any likelihood of completely losing a driving connection between the engine and propeller while changing gears.

An additional object is the provision of over-running jaw clutch means conditionable to automatically establish the higher ratio train at the instant of predetermined deceleration of the engine relatively to the propeller.

A further object is the provision of a change-speed transmission operable through a gear train in its highest speed connection while employing parts of the lower ratio train as a vibration dampener.

Still a further object is the provision of an improved change-speed transmission capable of large power transmitting capacity through a higher ratio speed reduction power train thus adapting it for use upon the larger craft with variable pitch propellers to enable the engine to more efficiently deliver the necessary power for driving the propeller when it is set at high pitch and the craft is driven at high cruising speed.

These and other desirable objects encompassed by and inherent in the invention will become apparent from the ensuing description and appended claim together with the drawings, wherein:

Fig. 1 is a side elevational view partly in section of a transmission constructed according to the principles of the present invention;

Fig. 2 is a composite sectional view of which equa-angular sectors are taken respectively upon the three planes indicated by the lines 2—2—2 in Fig. 1;

Fig. 3 is a perspective view of skeleton-like bearing frame comprising a part of the apparatus shown in Figs. 1 and 2;

Fig. 4 is a sectional view taken on the line 4—4 of Fig. 1, illustrating clutch shifter mechanism;

Fig. 5 is a fragmentary view taken on the line 5—5 of Fig. 1;

Fig. 6 is a side elevational view partly in section of a modified form of the invention;

Fig. 7 is a fragmentary view taken on the line 7—7 of Fig. 6;

Fig. 8 is a fragmentary sectional view illustrating the modification of Fig. 6 together with speed responsive means for actuating the over-running jaw clutch.

Each of the two embodiments herein shown employs two speed-reduction gear trains of different speed ratio, the ratio of each being such that the drive shaft exceeds that of the driven or propeller shaft. There is no direct drive connection or power train through which the propeller shaft would be caused to rotate at the same speed as the drive shaft, and in each of these embodiments the lower ratio power train is over-running in character whereby, as later fully explained, the craft engine and the transmission drive shaft connected therewith can be decelerated relative to the propeller and the propeller shaft connected therewith to enable the establishment of the higher ratio train by bringing the counterparts of an overrunning jaw clutch into synchronism for meshing, the lower ratio train remaining mobilized during operation of the thus established higher ratio train.

Referring now to the Figs. 1, 2, 3 and 4, the first embodiment will be seen enclosed in a casing 10 preferably of an aluminum alloy or other suitable light material, open at its back end where there is a circumferential flange 11 which together with bolts 12 therein serve to connect the casing with an engine of which a part is shown at 13. An engine crankshaft 14 serves as the drive shaft for the apparatus, said shaft being arranged co-axially with a hollow propeller shaft 15 and an intermediate shaft 16. The back end of the intermediate shaft is journalled in the forward end of the shaft 14 by means of a ball bearing unit 17 and the forward end of said intermediate shaft is journalled in the back end of the propeller shaft 15 by means of a ball bearing unit 18.

Three hollow countershafts 19, 20 and 21 are carried within a frame 22 which is shown in perspective in Fig. 3. This frame 22 is preferably a unitary casting of steel or other suitably rigid and strong metal. It comprises a circular back plate 23 containing a central opening 24 and three openings as 25 and 26 spaced radially from the central opening and arranged equaangularly thereabout. These openings as 25 and 26 are for receiving the back ends of the countershafts as 19, the opening 25 receiving said countershafts as 19 as illustrated in Fig. 1. A multiple opening head 27 of the frame 22 includes a central opening 28 and three openings 29, 30 and 31 of which the opening 28 is coaxial with the opening 24 in the plate 23 and of which the openings 29, 30 and 31 are respectively coaxial with the three openings as 25 and 26 in said plate. Thus the openings as 29 are adapted to cooperate with their respectively paired openings as 25 in supporting the hollow countershafts as 19. There are three transversely profiled spanning members 32, 33 and 34 interconnecting the multiple opening head 27 and the disk 23. Each of the spanning members as 32 is substantially channel-shaped inasmuch as it includes a longitudinal web portion 36 flanked by flanges 37 and 38. The spanning members are further strengthened by gusset flanges 39.

The frame 22, after having the various shafting and gears assembled therewith, is inserted forwardly into the casing 10 to slide the circular wall portion 41 thereof about the opening 28 into a closely fitting opening 42 formed within a transverse wall 43 of the casing and to carry an outer edge portion upon the front face of the disk 23 into abutting relation with the back side of an annular flange 44 projecting radially inwardly from the casing wall. Arcuate seating surfaces 45 upon the back ends of the spanning members as 32 are adapted to rest upon the inner periphery of the flange 44 to cooperate with the circular wall portion 41 and the opening 42 in the flange 43 to hold the frame openings 24 and 28 in coaxial alignment with the shafts 14 and 15. A plurality of openings 46 are formed in the marginal edge portion of the disk 23 for aligning with corresponding openings in the casing flange 44 and receiving therewith bolts 46a for retaining the frame 22 in assembly with the casing.

The propeller shaft 15 is journalled at the forward end of its root portion in a ball bearing unit 47 which is mounted in the front end of the casing 10. A back end portion of said propeller shaft is journalled upon a set of roller bearings 48 for which an inner peripheral section 49 within the frame member 22 effects an outer race. A gear 50 formed integrally with the back end of the propeller shaft constantly meshes with the gears G1 which are the foremost gears respectively upon three countershaft gear-clusters GA, GB and GC. Each gear-cluster as GA includes a forward gear G1 of least diameter, a center gear G2 of greatest diameter and a rearmost gear G3 of intermediate diameter. Said gear-clusters are journalled respectively upon the countershafts 19, 20 and 21 by means of needle bearing sets 51 and 52. There is ample room between the flanges 37 and 38 of the frame spanning members 32, 33 and 34 for these gear-clusters as will be seen in Fig. 2. The three gears G2 mesh with a gear 53 upon the intermediate shaft 16 whereas the gears G3 mesh with a gear 54 upon the back end of a sleeve shaft 55 which is journalled upon said shaft 16 by sets of needle bearings 56 and 57.

One counterpart 58 of a jaw clutch 59 has its hub portion splined at 60 to the sleeve shaft 55, said hub portion having associated therewith a circumferential groove 61 for receiving the studs 62 of a shifter fork 63 of which the hub 64 is pivoted upon a cross-shaft 65 journalled within suitable bearings B upon the back side of the frame plate 23 and within a bearing C in the casing side wall. A driving toothed counterpart 66 of the jaw clutch 59 is integral with a driving ring 67 of an overrunning clutch generally designated 68. In addition to the ring 67 the overrunning clutch comprises the conventional rollers 69, of which one is shown in Fig. 1, spaced circumferentially about the inner periphery of the ring 67 and an actuator member 70 of which the hub 71 is splined at 72 to the intermediate shaft 16. Said actuator member 70 is so designed as to cause the rollers 69 to wedge against the inner periphery of the ring 67 for causing said ring to transmit rotative driving force through the rollers to said actuating member when the ring is rotated counter-clockwise as viewed from the front, said actuator member, however, permitting the rollers 69 to terminate this wedged condition when said actuator member tends to rotate clockwise relatively to the ring. A cage 73 for the clutch rollers 69 comprises an end plate 74 which is constantly urged counterclockwise by a spring 75 which has one end fixed to the hub 71 and its opposite end 76 hooked over a tongue 77 projecting inwardly from the end plate 74. Counter-clockwise rotation of the ring 74 is limited by a boss 78 projecting backwardly from the actuator member 70. The function of the spring in this action upon the cage 73 is to urge the rollers 69 toward the position for wedging between the members 67 and 70, wherefore the drive will be taken up immediately without slipping when rotative forces are applied tending to rotate the ring 67 counter-clockwise as aforesaid relatively to the actuator member 70. The ring 67 is fixed to the drive shaft or engine crankshaft 14 by a plurality of bolts 79.

The transmission will be conditioned for driving the propeller shaft 15 from the drive shaft 14 through the first or low ratio power train when the clutch 59 is disengaged as shown in Fig. 1. Disengagement of the clutch 59 is brought about by rotating the cross shaft 65 and hence the shifter fork 63 clockwise, as viewed in Fig. 1, to the position there shown. Such rotation of the shaft 65 is effected from the pilot's compartment by manipulating a linkage (not shown) connected with an arm 80, Fig. 4, which is fixed upon said shaft. A spring S wrapped about the shaft 65 and having one end hooked about a pin in the shaft and its opposite end abutting against a stud 81 on the shifter fork is operable to transmit the aforesaid clockwise movement from the shaft to the shifter fork. Another spring S' with an end hooked about the opposite side of the pin P and with its opposite end engaging the stud 81 is operable to transmit counter-clockwise rotation from the shaft to the shifter fork. Each spring S and S' is adapted to be wound up by the shaft 65 when the shifter fork encounters resistance to rotation, and to unwind incident to rotating said fork when the resistance ceases. A spring detent device D is cooperable with circumferentially spaced notches N in an arm A fixed for rotation with the shaft 65, to prevent accidental displacement of the shaft from either of its oscillative limits.

With the apparatus conditioned as shown in Fig. 1, and with the engine idling, the shaft 14 will be driven by said engine and the propeller shaft will be driven at a somewhat slower idling speed through the first speed power train. This power train includes the overrunning clutch 68, the intermediate shaft 16 to which the clutch actuator member 70 is splined at 72, gear 53, countershaft gears G2 meshed with said gear 53, countershaft gears G1 which rotate with the gears G2, gear 50 which is meshed with the gears G1, and the propeller shaft 15 which rotates with the gear 50. In view of the relative diameters of the gears 53 and G2 and of the gears G1 and 50 the shaft 15 will be driven more slowly than the shaft 14. This speed reduction is sufficient to enable the engine to rotate at a relatively great speed so that it can develop a correspondingly greater amount of power during take-off.

The craft will be driven through the low speed train during take-off and climb, and after the desired altitude has been attained the operator may shift into the higher ratio second speed train by closing the engine throttle whereby the crankshaft or transmission drive shaft 14 will decelerate relatively to the propeller shaft 15 and the propeller (not shown) connected therewith, this deceleration incurring an overrun of the overrunning clutch 68 since the actuator member 70 which is connected with the propeller shaft 15 through the first speed train will not decelerate as rapidly as the clutch ring 67. Neither will the driven counterpart 58 of the jaw clutch 59 decelerate as rapidly as the clutch ring 67 since this counterpart is connected through the sleeve shaft 55 and the gears 54 and G3 with the propeller shaft. During operation of the first speed train, due to the pitch ratio of the gears 53 and G2 relative to that of the gears 54 and G3, the gear 54 and hence the clutch counterpart 58 are rotated more slowly than the clutch counterpart 66 which is connected directly with the drive shaft 14. Consequently as the drive shaft 14 decelerates as an incident to changing power trains, the clutch driving part 66 will eventually slow down to synchronism with the driven counterpart 58. Prior to causing such deceleration, however, the operator will have actuated the aforesaid control linkage for the cross shaft 65 to have rotated this shaft counter-clockwise, as viewed in Fig. 1, to cause the spring S' to be wound up incident to urging the shifter fork counter-clockwise and the clutch counterpart 58 axially into ratcheting relation with the counterpart 66, wherefore the clutch teeth will be meshed the instant of synchronism. The bevelled faces F upon the opposed ends of these clutch teeth facilitate this ratcheting. When the counterparts 58 and 66 become thus meshed the second speed power train will be established and power will then be transmittable from the drive shaft 14 through the jaw clutch 59, the sleeve shaft 55, gear 54, gears G3, gears G1, gear 50 and the propeller shaft 15. Since the gear 54 is of greater diameter than the gear 53 and the gears G3 are of less diameter than the gears G2, the gear-clusters GA, GB and GC will be rotated at greater speed for a given engine speed through the gear 54 than through the gear 53 so that less speed reduction is incurred through the second speed connection. During operation of the second speed power train the gears G2 will cause the gear 53 to rotate at greater speed than the gear 54 wherefore the intermediate shaft 16 and the overrunning clutch actuator member 70 will be rotated at an overspeed with respect to the clutch ring 67 as permitted by the overrunning clutch rollers 69 in the manner aforesaid. This fast spinning of the gear 53, the shaft 16 and the actuator member 70 causes these parts to serve as a dampener of vibrations that may develop in the higher ratio train at certain operating speeds.

The use of gears in the second speed power train, in contradistinction to a direct drive connection, makes it possible to design this train for adapting an engine to operate within its most economical speed range by providing the proper speed reduction to enable it to drive the propeller within its most efficient speed range under cruising conditions.

While cruising the operator can quickly shift back into the first speed train for obtaining additional power necessary to meet an emergency, simply by closing the engine throttle enough to relieve the torque upon the teeth of the jaw clutch 59, then manually demeshing the counterparts of this clutch and again speeding the engine to take up the drive through the first speed train.

It will be seen therefore that in this form of transmission device, the propeller shaft 15 is never disconnected from the engine since one or the other of the power trains will always be conditioned for transmitting power between the shafts 14 and 15.

There is the further advantage in this transmission that the multiple countershaft gearing arrangement increases the number of gear teeth through which the driving force is transmitted, thereby combining into a single unit of relatively small dimensions a power transmission organization capable of carrying great load.

Furthermore, since each of the power trains includes gears, the apparatus is adaptable for obtaining a desired speed ratio in either of the two trains, which flexibility is not available when one of the power trains is a direct drive connection wherein a one-to-one speed ratio is obtained between the drive and driven shafts.

Additional advantages are incurred through the design and arrangement of parts for minimizing weight, particularly in the design of the frame member 22 of which the transversely profiled spanning members as 32 are so shaped that they will result in said frame member being rigid although its elements are relatively thin. Both the circumferential and radial extent of the flange and web portions of said members as 32 enable these members to brace the frame against twisting and to secure the disk 23 and the apertured head 27 against relative axial or radial displacement. This inner frame 22, inherently light in weight because of its design, provides adequate support for the shafts mounted therein so that the casing 10 will be relieved of this function and can therefore be made comparatively thin and of a material characterized by lightness rather than strength.

That form of the invention shown in Fig. 6 is also a two-speed structure in which speed reduction is provided between drive and driven shafts, but wherein a planetary gear unit is employed instead of multiple countershaft gearing.

This form of the invention includes a gear casing 100 attachable to an end of an engine (not shown) by means of a flange 101 about its open back end. A drive shaft 102 for this transmission may constitute a part of the engine crankshaft. The forward end of the shaft 102 contains a ball bearing unit 103 in which the back end of an intermediate shaft 104 is piloted. The forward end of the intermediate shaft 104 rides upon needle bearings 105 which roll about the cylindrical wall 106 of a recess in the back end of a hollow propeller shaft 107. The shafts 102, 104 and 107 will be seen to be coaxial and relatively rotatable. Said propeller shaft is rotatively carried in a ball bearing unit 108 mounted in the front wall of the casing.

The propeller shaft 107 is drivingly connected with and in the present instance is integral with the forward end plate 109 of a planetary gear carrier 110. This carrier also includes a back end plate 111 of which a hub portion 112 is rotatively supported in a ball bearing unit 113. Thus the planet gear carrier is freely rotatable in the ball bearing units 108 and 113, of which the latter is in turn supported within a central opening 114 in a disk-like plate 115 of which the circular edge 116 rests upon a shoulder 117 circumscribing the inner periphery of the casing. The disk-like member 115 as well as a ring 118, which is in threaded engagement at 119 with a circular threaded portion of the casing, are made of steel in contradistinction to the lighter material as an aluminum alloy of which the casing is made. A plurality of bolts 120 serve to connect the disk 115 with the ring 118 whereby these parts reinforce the casing in its support of the transmission gearing and shafting.

The planet gear carrier 110 has a plurality of shafts 120a anchored in and extending between its end plates 109 and 111, these shafts being spaced circumferentially about the carrier in the usual manner. Each of these shafts 120a has a planet gear-cluster 121 journalled thereon upon needle bearings 122 and 123 and each gear-cluster 121 comprises a small diameter gear 124 and a large diameter gear 125 of which the latter mesh with a ring gear 126 fixed to the casing. The planet gears 125 also mesh with a sun gear 127 fixed upon the intermediate shaft 104 whereas the planet gears 124 mesh with a sun gear 128 integral with a sleeve shaft 129 rotatively carried upon needle bearings 130 in the hub 112 of the planet gear carrier. There is splined to the back end of the sleeve shaft 129 an overrunning jaw clutch counterpart 131 having teeth 132 meshable with teeth 133 upon a complemental counterpart 134 connected to the drive shaft 102 by bolts 135. These counterparts 131 and 134 are respective parts of a jaw clutch 136. The counterpart 134 is integral with an overrunning clutch ring 137 comprising part of an overrunning clutch 138 which also includes clutch rollers 139 disposed within a cage 140 and between the ring 137 and an actuator member 141. The latter is splined to the intermediate shaft 104 at 142.

Engagement and disengagement of the jaw clutch 136 is controlled by a shifter fork 143 having studs 144 disposed within a groove 145 circumscribing the counterpart 131. A manually operable cross shaft 146 journalled in the casing 100 has the hub 147 of the shifter fork pivotally mounted thereon and an arrangement as that illustrated in Fig. 4 may be employed for rotating said fork. When the clutch 136 is disengaged the first or low speed power train will be conditioned for operation, the drive being from the shaft 102 through the overrunning clutch 138, splined connection 142, intermediate shaft 104, sun gear 127, planet gears 125 which are then caused to roll about the toothed periphery of the ring gear 126, planet carrier 110 which is rotated by the revolving planet gears 125, and the propeller shaft 107 which is rotatable with the carrier. While the first speed train is in operation the planet gears 124 will be rotating at the same speed as the planet gears 125 and will be revolved therewith, but since the gears 124 are of less diameter than the gears 125 their toothed peripheral speed is less than that of the gears 125 wherefore the gear 128, though caused to rotate in the same direction in which the planet carrier rotates, will be caused to rotate at less speed than the sun gear 127. Consequently the jaw clutch counterpart 131 connected with the sun gear 128 will be caused to rotate at less speed than the counterpart 134 which is connected with the sun gear 127 and with the drive shaft 102.

A shift from the first speed to the second speed train is executed, when it is desired to drive the craft under cruising conditions, by closing the engine throttle and thus causing the drive shaft 102 and the clutch counterpart 134 to slow down relatively to the overrunning clutch actuator 141 and the clutch driven counterpart 131, as permitted by the clutch rollers 139, since said parts 141 and 131 will then be caused to continue rotation according to the speed of the propeller with which they are connected, the latter decelerating less than the engine with which the shaft 102 is connected. Meanwhile the operator will have operated the shifter fork control to place the clutch counterparts in ratcheting relation so that when the shaft 102 slows down sufficiently for the clutch counterpart 134 to synchronize with the counterpart 131, the spring (not shown but corresponding to the spring S' in Fig. 4) will mesh the teeth of these counterparts and thereby establish the second speed power train. Such ratcheting is facilitated by the bevelled end faces F on the ends of the clutch teeth as illustrated in Fig. 7. Upon establishment of the second speed train the drive will be from the shaft 102 through said clutch 136, sleeve shaft 129 to which the counterpart 131 is splined, gears 128 and 124, gears 125 which are driven with the gears 124 and thus caused to revolve about and within the ring gear 126, the planet carrier 110 which is caused to rotate with the revolving gears 125, and the propeller shaft 107. Because of the ratio of the gears 128 and 124 and of the gears 125 and 127, less speed reduction is obtained through this second power train than through the first speed train. However, as in the first embodiment the first speed sun gear 127, the intermediate shaft 104 and the actuator member 141, due to their high speed of rotation and inertia, serve as a vibration dampener during second speed operation.

A shift back into the first speed train can be executed at will by manually rotating the shifter fork 143 to disengage the clutch 136.

I have shown in Fig. 8 a speed responsive mechanism incorporated into the second modification structure for effecting the shift into the second speed train automatically upon the deceleration of the engine subsequent to the attaining of a speed at which this apparatus becomes effective. In adapting the transmission for the attachment of this speed responsive mechanism, the overrunning clutch ring 137 is provided with a backwardly directed peripheral flange portion 150a on which there are a plurality of sets of paired ears 151a (one being shown in Fig. 8) of which each pair receives therebetween the hub 152 of a centrifugal weight 153, pivot pins 154 being anchored in each pair of ears 151a for pivotally supporting the weights 153. Heel portions 155 upon each of the weights 153 are adapted to abut against the flange 150a to limit outward movement of the weights under their centrifugal force. A clutch counterpart 134' corresponding to the counterpart 134 and having internal teeth 133' corresponding to the teeth 133 is splined at 156 upon the ring 137 whereby the counterpart 134' can be slid forwardly for meshing its teeth with the teeth 132. Said counterpart 134' has a flanged ring 157 slidably mounted thereon, and a radial flange 158 which reacts against one end of a helical spring 159 of which the opposite end is reacted upon by the ring 157.

A plurality of bolts 160 anchored to the flanged portion of the drive shaft 102 project forwardly through suitable apertures in the ring 157, and the forward ends of these bolts 160 are provided with nuts 161 for confining helical springs 162 therebetween and the ring 157. It is these springs 162 that provide the principal resistance to the outward throw of the inertia weights 153 by centrifugal action while studs 163 upon these weights urge the ring member 157 forwardly to compress said springs.

A centrifugal mechanism of this kind is fully shown and described in my United States Patent No. 2,170,649, issued August 22, 1939.

In the operation of the device, assuming the transmission to be connected in the first speed train, after the engine has attained a predetermined speed, the weights 153 will compress the springs 162 to move the clutch counterpart 134' forwardly to place the teeth 133' in ratcheting relation with the teeth 132, the movement of the ring 157 being far enough forwardly to place the spring 159 under sufficient compression to force the teeth 133' into mesh with the teeth 132 when the counterparts synchronize. While the ratcheting condition prevails the operator may effect the shift into the high ratio train by closing the engine throttle and thus causing the drive shaft 102 and the clutch counterpart 134' to slow down to synchronism with the clutch counterpart 131 whereupon the compressed spring 159 will slide the teeth 133' into mesh with the teeth 132, establishing the higher ratio train.

Reestablishment of the first speed train is effected by slowing down the engine until the springs 162 overcome the centrifugal force of the weights 153 and press the ring 157 backwardly against a snap ring 164 and to continue the backward movement thereof to then slide the counterpart 134' backwardly for demeshing the teeth 133' and 132.

The embodiments herein disclosed are illustrative only, it being understood that other modifications and changes in details may be made without departing from the spirit of the invention.

I claim:

In change-speed apparatus for drivingly connecting the engine of an engine-driven craft with a propeller for such craft, a casing, a propeller shaft, a drive shaft and an intermediate shaft all in coaxial relation, a plurality of countershafts spaced radially from and circumferentially about said coaxial shafts and fixed in said casing to prevent revolving movement of such counter shafts about the coaxial shafts, a free-wheeling gear train disposed between the engine and propeller shafts and of a speed reduction ratio adapting it for driving the propeller shaft under take-off conditions, said free-wheeling train comprising a gear fixed for rotation coaxially with the propeller shaft, a first set of countershaft gears respectively upon and rotatable with the countershafts and meshed with the propeller shaft gear, a gear fixed for rotation with the intermediate shaft, a second set of countershaft gears respectively upon and rotatable with the countershafts and meshed with the intermediate shaft gear and an overrunning clutch device drivingly connecting the drive and intermediate shafts, and a second gear train of less speed reduction than the free-wheeling train and suitable for driving the propeller shaft under cruising conditions, said second train including a gear encircling the intermediate shaft for rotation coaxially of the coaxial shafts and a third set of countershaft gears respectively fixed for rotation with the countershafts and meshed with the last named gear, and disengageable overrunning jaw clutch means engageable to connect said last named gear for rotation with the drive shaft, means actuatable to yieldably urge said clutch into engagement, and control means alternately operable at will to actuate said urging means and to disengage the clutch.

OSCAR H. BANKER.